(12) United States Patent
Radermacher et al.

(10) Patent No.: US 9,603,216 B2
(45) Date of Patent: Mar. 21, 2017

(54) DRIVER DEVICE AND DRIVING METHOD FOR DRIVING A LOAD, IN PARTICULAR A LIGHT UNIT

(71) Applicant: PHILIPS LIGHTING HOLDING B.V., Eindhoven (NL)

(72) Inventors: Harald Josef Günther Radermacher, Aachen (DE); Peter Deixler, Valkenswaard (NL); Peter Hubertus Franciscus Deurenberg, s-Hertogenbosch (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 14/415,436

(22) PCT Filed: Jul. 12, 2013

(86) PCT No.: PCT/IB2013/055759
§ 371 (c)(1),
(2) Date: Jan. 16, 2015

(87) PCT Pub. No.: WO2014/013407
PCT Pub. Date: Jan. 23, 2014

(65) Prior Publication Data
US 2015/0208479 A1      Jul. 23, 2015

Related U.S. Application Data

(60) Provisional application No. 61/671,940, filed on Jul. 16, 2012.

(51) Int. Cl.
*H05B 41/36* (2006.01)
*H05B 37/02* (2006.01)
(Continued)

(52) U.S. Cl.
CPC ..... *H05B 33/0851* (2013.01); *H05B 33/0815* (2013.01); *H05B 33/0848* (2013.01);
(Continued)

(58) Field of Classification Search
None
See application file for complete search history.

(56) References Cited

U.S. PATENT DOCUMENTS 5,952,797 A * 9/1999 Rossler ................ A63H 19/10
104/DIG. 1
6,128,205 A    10/2000 Bernd et al.
(Continued)

FOREIGN PATENT DOCUMENTS

WO    2008112820 A2    9/2008

OTHER PUBLICATIONS

AN1089 Control Loop Modeling of L6561-Based TM PFC, available at: http://www.st.com/internet/com/TECHNICAL_RESOURCES/TECHNICAL_LITERATURE/APPLICATION_NOTE/CD00004066.pdf.

*Primary Examiner* — Crystal L Hammond

(57) ABSTRACT

The present invention relates to a driver device (10) for driving a load (14), in particular a light unit (14) having one or more light emitters, comprising input terminals for receiving an input voltage (V10) from an external power source (12), output terminals for providing electrical power to the load for powering the load (14), a driver stage (16) connected to the input terminals and to the output terminals, wherein the driver stage (16) is adapted to control an input current (I1) drawn from the external power supply (12) and to control the electrical power provided to the output terminal shaving a predefined level, a detection device (24) for measuring at least one electrical parameter (V10, V12, I2, V20) of the driver stage (16) and for determining an input voltage deviation from predefined supply conditions on the (Continued)

basis of the electrical parameter (V10, V12, I2, V20), wherein the driver stage (16) is adapted to control the input current (I1) according to predefined conditions if the input voltage deviation is lower than a threshold level (63) and to allow a deviation of the input current (I1) from the predefined conditions if the input voltage deviation exceeds the threshold level (63).

14 Claims, 4 Drawing Sheets

(51) Int. Cl.
*H05B 33/08* (2006.01)
*H02M 1/42* (2007.01)
*H02M 1/00* (2006.01)

(52) U.S. Cl.
CPC ....... *H05B 37/0227* (2013.01); *H02M 1/4225* (2013.01); *H02M 2001/0022* (2013.01); *Y02B 70/126* (2013.01)

(56) References Cited

U.S. PATENT DOCUMENTS

| | | | | |
|---|---|---|---|---|
| 8,379,420 | B2* | 2/2013 | Orr | H02M 1/4208 323/222 |
| 2003/0214242 | A1* | 11/2003 | Berg-johansen | 315/169.3 |
| 2006/0170375 | A1* | 8/2006 | Okamoto et al. | 315/291 |
| 2008/0205103 | A1 | 8/2008 | Sutardja et al. | |
| 2010/0045210 | A1* | 2/2010 | Hariharan | 315/297 |
| 2010/0060182 | A1 | 3/2010 | Stack | |
| 2011/0062888 | A1* | 3/2011 | Bondy et al. | 315/294 |
| 2011/0121754 | A1* | 5/2011 | Shteynberg et al. | 315/294 |
| 2012/0098457 | A1* | 4/2012 | Radermacher | 315/291 |
| 2012/0112712 | A1 | 5/2012 | Kim et al. | |
| 2012/0169240 | A1* | 7/2012 | Macfarlane | 315/152 |
| 2012/0206064 | A1* | 8/2012 | Archenhold | 315/297 |
| 2012/0224401 | A1* | 9/2012 | Phadke | H02M 3/1584 363/84 |
| 2013/0119869 | A1 | 5/2013 | Peng | |
| 2013/0193849 | A1* | 8/2013 | Zimmermann | H05B 33/0815 315/112 |
| 2013/0193878 | A1* | 8/2013 | Zimmermann | H05B 33/0842 315/307 |

* cited by examiner

DRIVER DEVICE AND DRIVING METHOD FOR DRIVING A LOAD, IN PARTICULAR A LIGHT UNIT

CROSS-REFERENCE TO PRIOR APPLICATIONS

This application is the U.S. National Phase application under 35 U.S.C. §371 of International Application No. PCT/IB13/055759, filed on Jul. 12, 2013, which claims the benefit of U.S. Provisional Patent Application No. 61/671,940, filed on Jul. 16, 2012. These applications are hereby incorporated by reference herein.

FIELD OF THE INVENTION

The present invention relates to a driver device and a corresponding driving method for driving a load, in particular a light unit having one or more light emitters. Further, the present invention relates to a light apparatus.

BACKGROUND OF THE INVENTION

Drivers for solid state light applications e.g. LED modules or retrofit lamps have to comply with mains harmonics regulations which may be defined by national or international standards, energy labels, the mains power provider, etc. Some of the standards are optional, but others are mandatory, because otherwise the product (light source including the driver) may not be released to the market in a certain region. Different kinds of power factor correction techniques are used to limit harmonics of the input current and to reduce the idle current drawn from the mains. In the optimal case, a sinusoidal input current is drawn from the mains, providing a sinusoidal supply voltage. This results in a high power factor and no harmonics, whereby an ohmic load is emulated which does not draw reactive power from the mains.

To control the input current, power factor control techniques are known wherein the power stage is a PFC stage controlled by a PFC controller. The PFC controller multiplies the rectified input voltage by a low-pass filtered command, representing an average power demand for driving the PFC stage and for controlling the instantaneous input current.

Alternatively, the driver devices can also be designed to generate a low total harmonic distortion level such that the mains harmonics regulations are fulfilled without requiring a dedicated PFC stage. Such a driver device is known e.g. from US 2010/0060182 A1.

As a further possibility to reduce the harmonic distortion, a passive input current shaper such as an RC or LC circuit may be used on the primary side in combination with a single-stage switch-mode power supply. In this case, the control loop of the switch-mode power supply results in a regulation between the bus voltage and the transferred power and is used to control the discharge of the electrical energy on the primary side which influences the harmonics during recharging of the primary capacitor.

As a further alternative solution, a linear driver such as a tapped linear driver (TLD) or switch matrix driver (SMD) may be used, wherein the current provided to the total LED load is controlled and power is guided in a certain manner into the segments, forming the total LED load, and wherein the shape of the input current is determined by the current into and the arrangement of the total LED load.

The limitation of the drivers known from the prior art is that the power delivered to the LED load matches the requirement as long as the mains voltage corresponds to the expected parameters, such as wave shape and amplitude. Control loop and parameters are designed to provide sufficient power to the load while maintaining the allowed input current harmonics. However, even if the mains signal is distorted, this control loop and these parameters are still applied. As a consequence, e.g. during a partial mains dropout or flat topped mains, the power delivery will fall below the average required power, because the control loop and parameters are designed for a nominal input signal. As a result, the driver devices known from the prior art cannot provide continuous stable power to the load if the mains voltage is distorted, even if the power train would allow for delivering sufficient output power.

SUMMARY OF THE INVENTION

It is an object of the present invention to provide a driver device and a driving method for driving a load, in particular a light unit having one or more light emitters, providing compatibility to mains harmonic regulations and coping with distorted mains supply voltages while providing continuous stable power to the load. Further, it is an object of the present invention to provide a corresponding light apparatus.

According to one aspect of the present invention, a driver device is provided comprising:
  input terminals for receiving an input voltage from an external power source,
  output terminals for providing electrical power to the load for powering the load,
  a driver stage connected to the input terminals and to the output terminals, wherein the driver stage is adapted to control an input current drawn from the external power supply and to control the electrical power provided to the output terminals having a predefined level,
  a detection device for measuring at least one electrical parameter of the driver stage and for determining an input voltage deviation from predefined supply conditions on the basis of the electrical parameter,
  wherein the driver stage is adapted to control the input current according to predefined conditions if the input voltage deviation is lower than a threshold level and to allow a deviation of the input current from the predefined conditions if the input voltage deviation exceeds the threshold level.

According to another aspect of the present invention, a driving method for driving a load is provided comprising the steps of:
  receiving an input voltage from an external power supply at input terminals,
  controlling an input current drawn from the external power supply and providing electrical output power to the output terminals having a predefined level for powering the load by means of a driver stage,
  measuring an electrical parameter of the driver stage,
  determining an input voltage deviation from predefined supply conditions on the basis of the electrical parameter, and
  controlling the input current drawn from the external power supply according to the predefined conditions if the input voltage deviation is lower than a threshold level and allowing a deviation of the input current from the predefined conditions if the input voltage deviation exceeds the threshold level.

According to still another aspect of the present invention, a light apparatus is provided comprising a light assembly having one or more light units, in particular an LED unit comprising one or more LEDs, and a driver device for driving said light assembly as provided according to the present invention.

Preferred embodiments of the invention are defined in the dependent claims. It shall be understood that the claimed method has similar and/or identical preferred embodiments as the claimed device and as defined in the dependent claims.

The present invention is based on the idea to measure an input voltage deviation by means of a detection device to determine whether the input voltage deviates from predefined supply conditions. If the input voltage complies with the predefined supply condition, the input current drawn from the external power source, in particular from the mains, has to be controlled according to, and has to comply with, predefined conditions, e.g. the mains harmonics regulation defined by the mains power supplier or by a corresponding legal regulation. If the deviation of the input voltage from the predefined supply conditions exceeds a certain level, the driver device may not be able to provide the required electrical power for powering the load, while still drawing an input current from the external power source, which complies with the predefined conditions. In that case, a deviation from the predefined conditions is allowed to provide a sufficient power level for powering the load. This is accomplished by changing the control loop or the parameters of the control loop. Hence, the necessary electrical power for powering the load can be continuously provided over a wider input signal deviation range, compared to a converter without these means, even if the input voltage deviates from the predefined supply conditions.

In a preferred embodiment, the driver device further comprises a control stage connected to the driver stage for controlling the driver stage, wherein the control stage is adapted to control the driver stage on the basis of a first control command or a first control parameter, if the input voltage deviation is lower than the threshold level, and on the basis of a second control command or a second control parameter or the first and the second control command or parameter, if the input voltage deviation exceeds the threshold level. This provides a simple solution for driving a driver stage depending on the input voltage deviation.

In a preferred embodiment, the control stage is adapted to determine the first control command or control parameter on the basis of the input voltage and the second control command or control parameter on the basis of the electrical output power level. This provides an effective possibility to control the driver device, wherein the input current is controlled on the basis of the input voltage if the input voltage deviation is less than the threshold level, and to control the input current on the basis of the electrical output power level if the input voltage deviation exceeds the threshold level, to deliver a continuous stable power to the load.

According to a further preferred embodiment, the control stage is adapted to control the driver stage on the basis of the two control commands or control parameters and on the basis of two weight factors determined on the basis of the input voltage deviation from the predefined supply conditions. This is a simple solution to reduce the regulation effort for controlling the input current, wherein a continuous driving signal can be provided dependent on the input voltage deviation.

According to a further preferred embodiment, the control stage is designed to adapt the threshold level on the basis of measured ambient conditions, a power level, an age of the load and/or an age of the driver device. This provides an individual regulation of the driver device adapted to the current ambient conditions and to the conditions of the load and the driver device.

According to a further preferred embodiment, the control stage is designed to adapt the weight factors within a cycle period of the input voltage. This provides a precise and effective possibility to control the input current values (?) individually according to the input current deviation.

In a preferred embodiment, the detection device is connected to the input terminals for detecting the input voltage as the electrical parameter. This is a simple and fast possibility to detect an input voltage deviation with low response time.

In a preferred embodiment, the predefined supply conditions are defined as a reference function for the input voltage. This provides a precise possibility to detect the input voltage deviation with low technical effort.

According to a further preferred embodiment, the detection device comprises a sampling device for sampling the input voltage.

According to a further preferred embodiment, the detection device comprises a reference generator for generating the reference function and for synchronizing the reference function with the input voltage. This provides a precise comparison of the reference function and the input voltage and reduces the regulation and measurement effort for determining the input voltage deviation.

According to a further preferred embodiment, the detection device is connected to the output terminals for detecting an electrical output parameter of the driver stage as the electrical parameter. This is an effective possibility to detect the input voltage deviation on the basis of the resulting output of the driver device.

In a preferred embodiment, the electrical parameter is determined on the basis of an internal control or sensing signal of the driver stage. This is a practical solution to detect the input voltage deviation with reduced technical effort, since an additional measurement device can be omitted.

According to a further preferred embodiment, the predefined conditions for the input current correspond to mains harmonic regulations. This provides a possibility to comply with the mains voltage supplier regulations or legal regulations and to get permission to operate the driver device and to connect the driver device to the mains.

According to a further preferred embodiment, the threshold level is equal to or larger than an allowed deviation of the input voltage from the predefined conditions, as allowed in the mains harmonics regulation.

As mentioned above, the present invention provides an improved driver device for driving a load, wherein the input current drawn from the external power source is controlled if the input voltage complies with the predefined supply conditions, and for providing a continuous electrical power even if the input voltage deviates from the predefined supply conditions, since a deviation from the predefined current conditions is allowed if the input voltage deviates from the predefined supply conditions. This is a solution which makes it possible to provide a reliable electrical power even if the input voltage deviates from the predefined supply conditions.

BRIEF DESCRIPTION OF THE DRAWINGS

These and other aspects of the invention will be apparent from and elucidated with reference to the embodiment(s) described hereinafter. In the following drawings

DETAILED DESCRIPTION OF THE INVENTION

Figure 1:
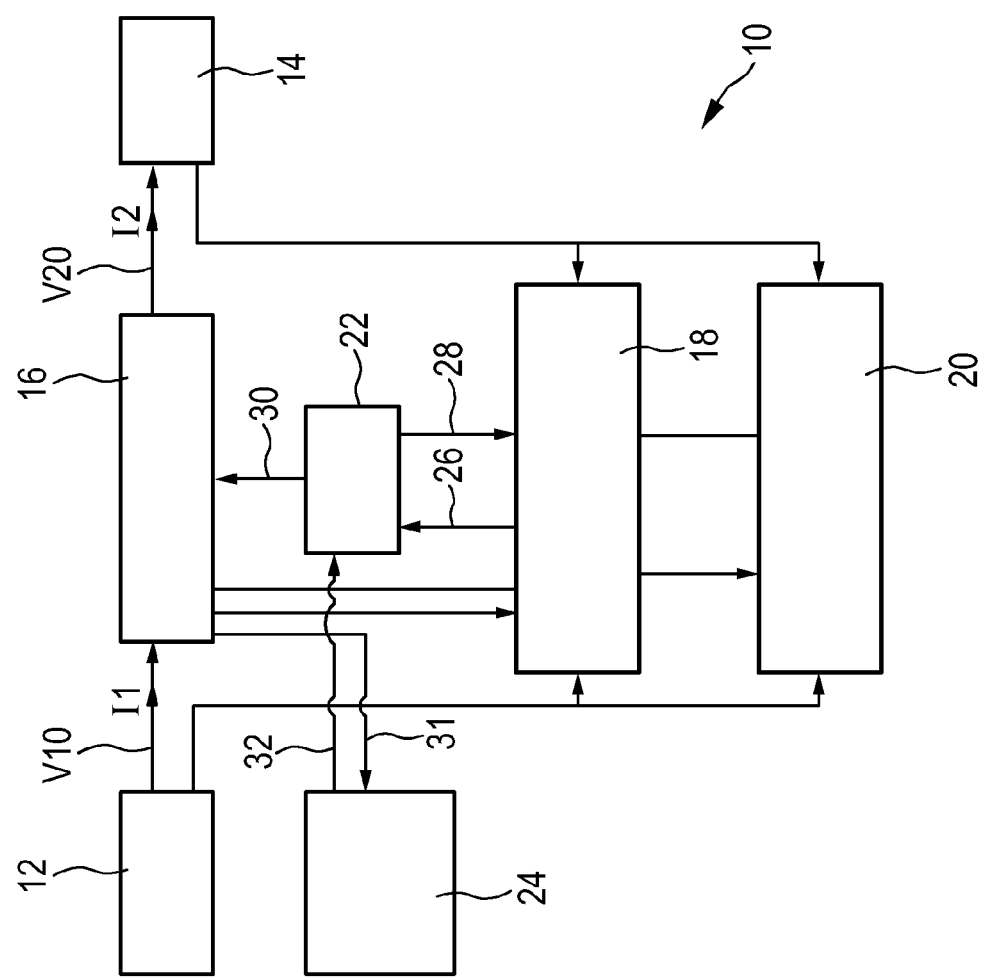
FIG. 1 shows a schematic block diagram of a driver device for controlling the input current drawn from the external power source.

FIG. 1 shows a schematic block diagram of a driver device generally denoted 10. The driver device 10 is connected to an external voltage supply 12, which is preferably the mains, and which provides a supply voltage V10 as an input voltage V10 to the driver device 10. The driver device 10 draws an input current I1 from the external voltage supply 12. The driver device 10 provides an output voltage V20 and an output current I2 to a load 14 for powering the load 14.

The driver device 10 comprises a driver stage 16 for converting the input voltage V10 to the output voltage V20 and for drawing the input current I1 and for providing the output current I2 for powering the load. The driver device 10 further comprises a normal control loop 18 and a backup control loop 20 each connected to the external voltage supply 12, to the load 14 and to the driver stage 16 for receiving input signals. The normal control loop 18 and the backup control loop 20 are connected to a control stage 22 which is connected to the driver stage 16 for controlling the driver stage 16.

The driver device 10 further comprises a detection device 24 connected to the driver stage 16 for detecting a deviation of the input voltage V10 from predefined supply conditions and connected to the control stage 22 for controlling the driver stage 16 on the basis of the input voltage deviation and on the basis of control parameters provided by the normal control loop 18 and the backup control loop 20.

The normal control loop 18 provides a first control command 26 or a first control parameter 26 to the control stage 22 on the basis of the input voltage V10 provided by the external voltage supply 12. The backup control loop 20 provides a second control command 28 or a second control parameter 28 to the control stage 22 on the basis of an output power demand of the load 14. The control stage 22 provides a control signal 30 to the driver stage 16 for driving the driver stage 16. The driver stage 16 controls the input current I1 drawn from the external voltage supply 12 and provides the output voltage V20 and the output current I2 on the basis of the control signal 30.

The detection device 24 detects the deviation of the input voltage V10 from the predefined supply conditions on the basis of an electric parameter 31 of the driver stage 16 and provides a control signal 32 to the control stage 22. The electrical parameter 31 of the driver stage 16 detected by the detection device 24 may be the input voltage V10, the output voltage V20, the output current I2 or an internal drive signal of the driver stage 16. The control stage 22 combines the first control command 26 or control parameter 26 and the second control command 28 or control parameter 28 on the basis of the input voltage deviation to form a corresponding control signal 30 for driving the driver stage 16.

If the input voltage V10 does not deviate from the predefined supply conditions or deviates slightly within predefined limits from the predefined supply conditions, the detection device 24 accordingly provides a control signal 32 to the control stage 22 and the control stage 22 provides the control signal 30 to the driver stage 16 on the basis of the first control command 26 or control parameter 26. The first control command 26 or control parameter 26 is generated by the normal control loop 18 on the basis of the input voltage V10 for controlling the input current I1 corresponding to the input voltage V10. In that case, the input current I1 is controlled to comply with predefined conditions like mains harmonic regulations required by the mains supplier and/or to comply with legal regulations to reduce the idle current drawn from the external voltage supply 12 and to emulate an ohmic load. The backup control loop 20 provides the second control command 28 or control parameter 28 to the control stage 22 on the basis of the power demand of the load 14. If the input voltage V10 deviates from the predefined supply conditions, the control stage 22 is adapted to provide the control signal 30 on the basis of the second control parameter 28, to provide the output voltage V20 and the output current I2 for powering the load 14 as demanded. If the deviation of the input voltage V10 is at a maximum level, the control signal 30 is based on the second control command 28 or control parameter 28 only. If the input voltage V10 corresponds to the predefined supply condition, the control signal 30 is based on the first control command 26 or control parameter 26 only. If the deviation of the input voltage V10 from the predefined supply condition is at a level between the maximum and the minimum, the control stage 22 will combine the first and the second control command or control parameter 26, 28 to a combined control signal 30 according to the degree of the input voltage deviation.

Hence, the driver device 10 controls the input current I1 according to predefined input current conditions if the input voltage V10 is within predefined supply conditions and allows to draw an input current I1 deviating from the predefined input current conditions. Therefore, the output power for powering the load 14 can be provided even if the input voltage V10 deviates from the predefined supply condition and draws an input current I1 according to the input current conditions if the input voltage V10 is within the predefined supply conditions such that an ohmic load is emulated.

Figure 2:
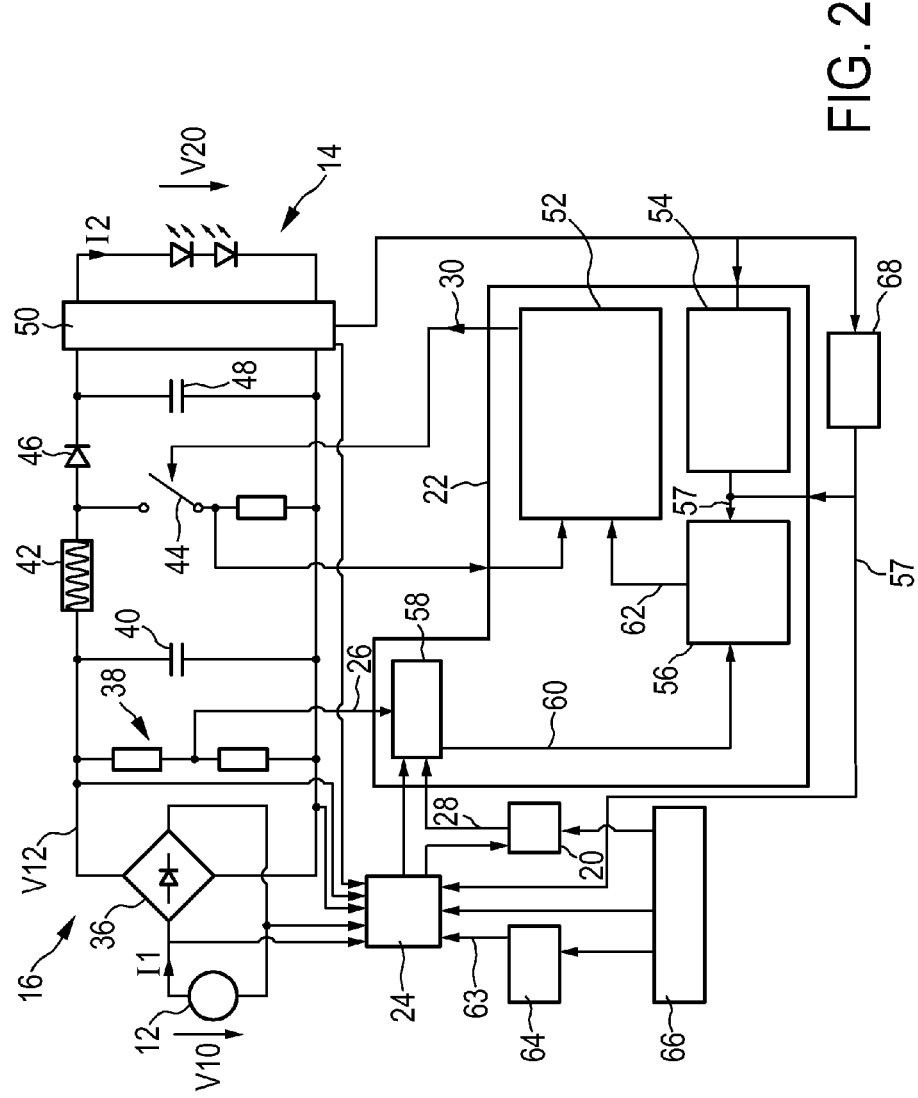
FIG. 2 shows a detailed block diagram of an embodiment of the driver device shown in FIG. 1.

FIG. 2 shows a detailed block diagram illustrating a special embodiment of the driver device 10. Identical elements are denoted by identical reference numerals, wherein here merely the differences are described in detail.

The driver stage 16 comprises a rectifier unit 36 for rectifying the input voltage V10 to a rectified input voltage V12. The rectifier unit 36 is connected to a voltage divider 38 and an input capacitor 40 connected in parallel to the rectifier unit 36. The rectifier unit 36 is further connected to an inductor 42 for electrically connecting the rectifier unit 36 to a controllable switch 44. The inductor 42 is further connected to a diode 46 and to an output capacitor 48. The driver stage 16 comprises an output measurement unit 50 connected in parallel to the output capacitor 48 for measuring the output voltage V20 and/or the output current I2. The load 14 is connected in parallel to the output measurement unit 50 and is formed of an LED unit 14.

The rectified input voltage V12 is provided to the inductor 42 and the controllable switch 44 is switched frequently to convert the rectified input voltage V12 to the output voltage V20 as desired, to provide the output current I2 to the load 14 and to draw the input current I1 from the external voltage supply 12. The controllable switch 44 is controlled by the control stage 22 as explained in the following.

The control stage 22 comprises a switch driver 52, an output signal regulator 54 and a multiplier 56. The switch driver 52 is connected to an output of the controllable switch 44 and to a control input of the controllable switch 44 for driving the controllable switch 44. The output signal regulator 54 receives an output signal, e.g. the output current I2, the output voltage V20 or the output power of the driver stage 16 from the output measurement unit 50 and provides an average power demand signal 57 to the multiplier 56. The multiplier 56 is connected to a combining device 58 for combining the first control parameter 26 received from the voltage divider 38 and the second control parameter 28 received from the backup control loop 20. A combined signal 60 provided by the combining device 58 and the average power demand signal 57 provided by the output signal regulator 54 are multiplied by the multiplier 56 and provided as an input signal 62 to the switch driver 52.

The detection device 24 detects an electrical parameter to determine an input voltage deviation from the predefined supply conditions. The detection device 24 is either connected to the input terminals of the driver stage 16 to detect the input voltage V10 as the electrical parameter or connected to the rectifier unit 36 to detect the rectified voltage V12 as the electrical parameter or connected to the output measurement unit 50 to detect an output parameter of the driver stage 16 as the electrical parameter. The detection device 24 receives a threshold level 63 from a threshold generator 64 which is determined on the basis of external parameter 66, e.g. dimmer settings, an ambient temperature, an age of the load 14, an age of the driver stage 16, a power level, and/or an ambient light level.

The detection device 24 receives the external parameter 66 and the average power demand signal 57 from a filter device 68 connected to the output measurement unit 50. The backup control loop 20 receives the external parameter 66 and the input voltage deviation from the detection device 24 for generating the second control parameter 28.

The detection device 24 controls the combining device 58 for combining the first and the second control parameter 26, 28 on the basis of weight factors according to the detected input voltage deviation from the predefined supply conditions.

Hence, the controllable switch 44 is controlled by means of the control signal 30 provided by the control stage 22 according to the input voltage V10 and an output power demand if the input voltage deviation from the predefined supply conditions is less than the threshold level 63 or the controllable switch 44 is controlled on the basis of the average power demand 57 provided by the output signal regulator 54 if the deviation of the input voltage V10 reaches a maximum level or on the basis of a combination of the input voltage V10 and the average power demand signal 57 if the deviation is between the threshold level 63 and the maximum level.

Figure 3:
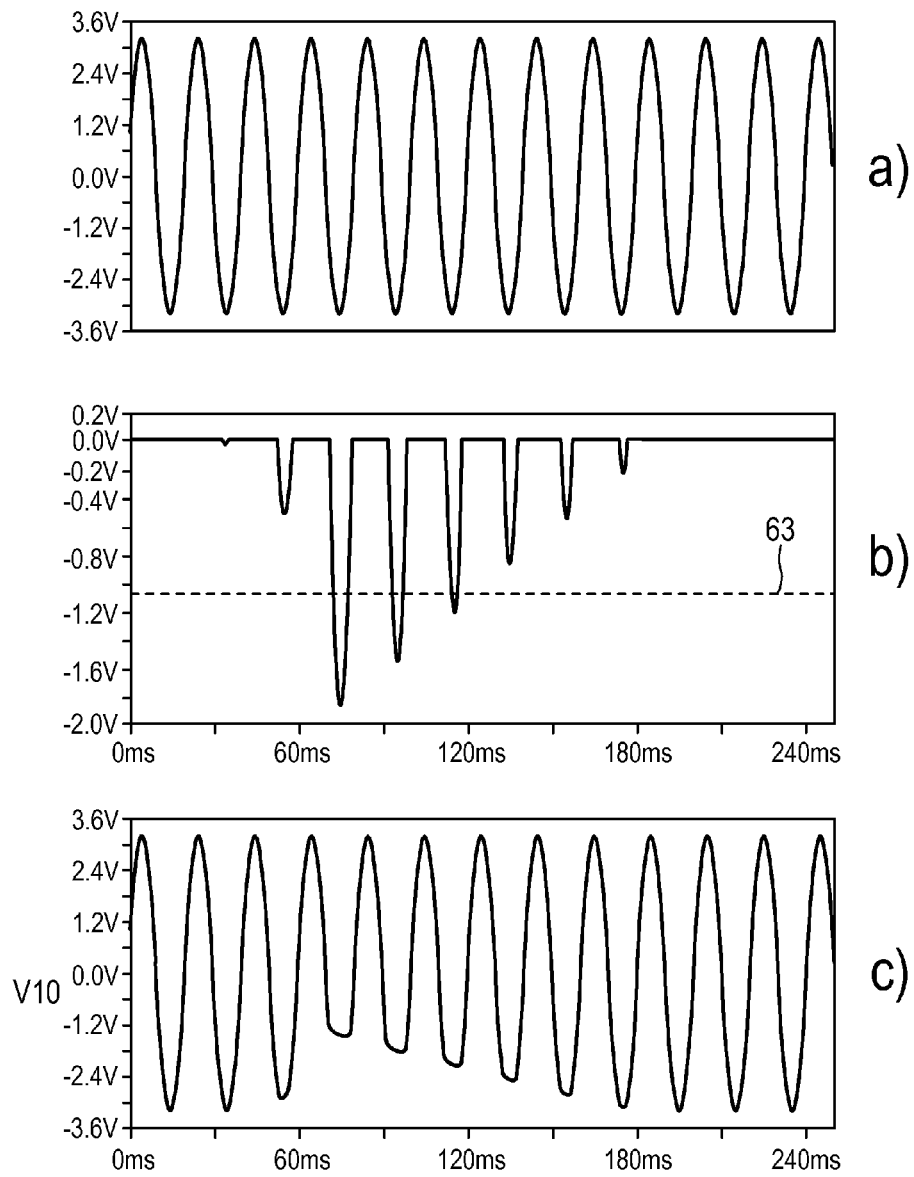
FIG. 3 shows a diagram illustrating the detection of an input voltage deviation from predefined supply conditions.

FIG. 3 shows a reference signal, a distorted input voltage V10 and a deviation function of the distorted input voltage V10 and the reference signal.

To detect the deviation of the input voltage V10 from the predefined supply conditions, an oscillator tuned and synchronized to the mains frequency may be implemented and produces a sinusoidal reference signal as shown in FIG. 3a. An example of a distorted input voltage V10 is shown in FIG. 3c. The distorted input voltage V10 is compared to the reference signal and the difference is shown in FIG. 3b.

The threshold level 63 to define the difference between the input voltage V10 and the reference signal can be based on an absolute difference to the expected signal or may be a combination of a relative error or a blanking threshold level around the zero crossing to avoid that inaccuracies result in large relative errors at a low input voltage that might cause false detection of distortion.

The comparison of the input voltage V10 and the reference signal provides a fast response and a precise input voltage deviation function, since an averaging of the input voltage V10 would provide a slow response and in the case shown in FIG. 3 the sinusoidal positive half wave would be averaged by the distorted negative half wave of the input voltage V10.

In this particular case, the deviation of the input current I1 from the predefined conditions should be allowed only during the distorted negative half wave of the input voltage V10 when the negative peaks of the comparison function exceed the threshold level 63. This leads to a precise control of the input current I1.

For the detection of the input voltage V10 a sampling unit can be used taking periodical measurements and comparing the measured values to predefined expected values of the input voltage V10. On the basis of predefined expected values e.g. stored in a lookup table, a deviation of the input voltage V10 from a sinusoidal waveform can be determined.

In a further simplified embodiment, the measurement device measures the peak value of the input voltage V10 or may determine an average of the input voltage V10. The peak values or the average value of the input voltage V10 are compared to the threshold level 63 defined by the threshold generator 64 to determine whether the input voltage V10 deviates from the predefined conditions.

Figure 4:
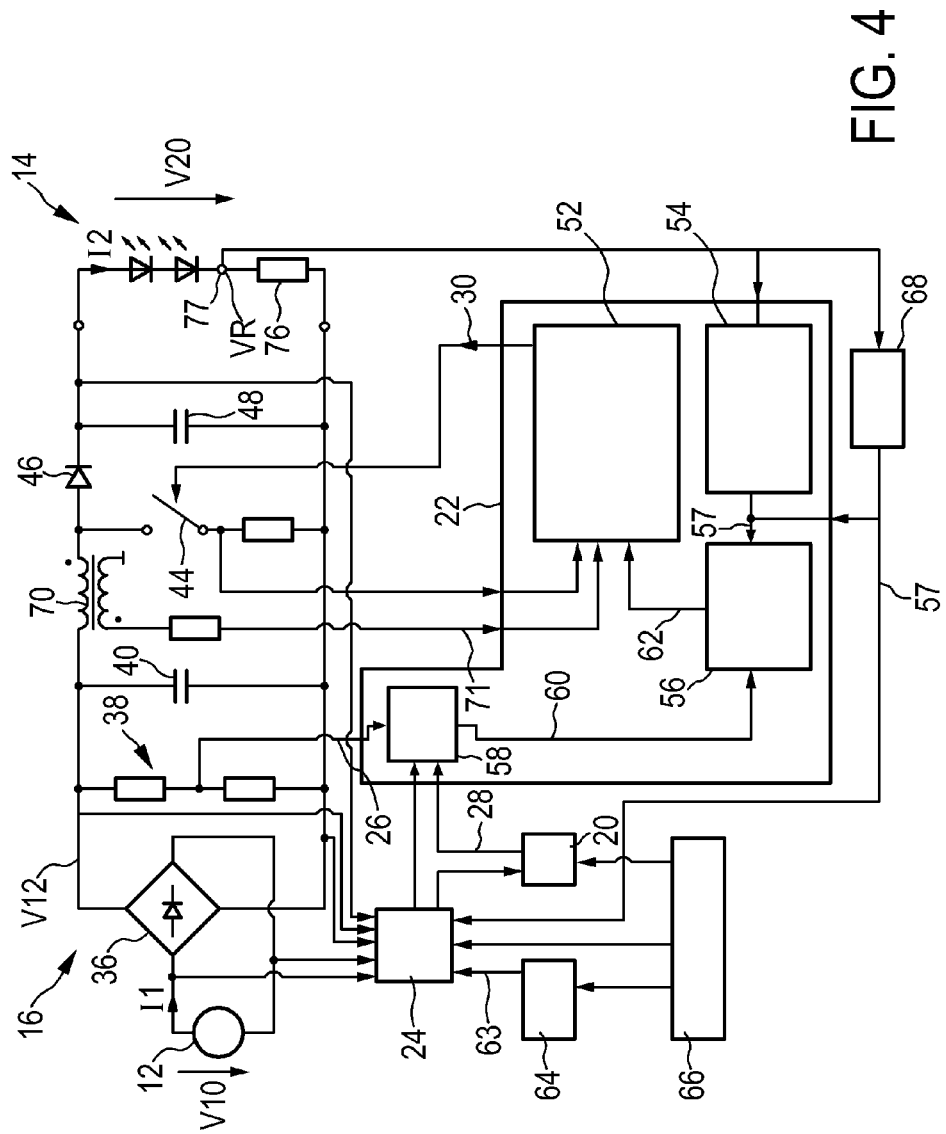
FIG. 4 shows a detailed schematic block diagram of an embodiment of the driver device according to FIG. 2.

FIG. 4 shows a certain embodiment of the driver device 10 of FIG. 2. Identical elements are denoted by identical reference numerals, wherein here only the differences are explained in detail.

The driver stage 16 comprises a transformer 70 connected between the input capacitor 40 and the controllable switch 44. The transformer 70 replaces the inductor 42. The transformer 70 serves as a zero current detection and provides a corresponding zero current signal 71 to the switch driver 52 for driving a controllable switch 44. Hence, the input current I1 can be controlled more precisely.

The driver stage 16 further comprises a resistor 76 connected in series to the load 14. A reference voltage VR is detected at a node 77 between the load 14 and the resistor 76 corresponding to the voltage drop across the resistor 76 and corresponding to the output current I2 in the load 14. The reference voltage VR is provided to the output signal regulator 54 for determining the average power demand signal 57.

The output current I2 can be provided as an input signal to the detection device 24 for determining the input voltage deviation from the predefined supply conditions.

In the case that the driver stage 16 is a constant on-time PFC stage, the multiplier 56 does not multiply the combined signal 60 and the average power demand signal at signal level but performs a multiplication by integrating the electric current in the inductor 42 or the transformer 70 during the on-time of the controllable switch 44. In such an application, the principle of this invention can be used too. The on-time, which is normally a constant parameter 26 for the control loop will be replaced by a backup-signal 28, resulting in non-constant on-time, such that a different input current is drawn.

A preferred application of the driver device 10 is a tapped linear driver (TLD). In this application, a certain length of an LED string is adapted to the input voltage V10. To produce a constant light output, the driver may include a switching mechanism and may output multiple currents I2', I2", etc. to the different segments of the load. At least one of the output currents I2, I2', I2" . . . of the tapped linear driver would be increased in the case of a reduced length of the LED string. The increase of the output power would result in an increase of the input current I1 and would increase the current drawn from the external voltage supply 12. Hence, the input current I1 would be increased for decreasing input voltage V10. This increase in current is restricted to certain limits in amplitude and to certain time spans, in order to have the predefined input current I1. E.g. the input current I1 may be limited to three times the current at the peaks of the normal mains voltage. If a deviation of the input voltage V10 from the predefined supply condition is detected, the restriction regarding the input current can be relaxed or dropped to ensure stable light output with the power/current handling capabilities of the driver and LED load. During distortion of the input voltage V10, a higher limit may be allowed, e.g. five times.

The present invention increases the output power by boosting to reach the nominal level during those periods when the mains voltage is reduced. This may result in a higher stress for the components in the driver device 10 and the load 14, potentially impacting the lifetime. The load 14 may log the events; when the output power of the driver stage 16 is increased and in the case that a critical duration of the boosting is reached, the output power can be reduced or the boosting can be omitted.

In the examples provided herein, the power provided to the load 14 is kept constant to provide a constant light output such that the user does not notice any distortion of the input voltage V10. Alternatively or additionally, the driver stage 16 may adapt the output power to a lower level to provide a higher tolerance if the mains voltage deviates from the predefined conditions. This may also be coupled with the logging of the boost duration.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunications systems.

Any reference signs in the claims should not be construed as limiting the scope.

The invention claimed is:

1. Driver device for driving a load comprising a light unit having one or more light emitters, comprising:
    input terminals for receiving an input voltage from an external power source,
    output terminals for providing electrical power to the load for powering the load,
    a driver stage connected to the input terminals and to the output terminals, wherein the driver stage is configured to control an input current drawn from the external power supply and to control the electrical power provided to the output terminals having a predefined level,
    a control stage connected to the driver stage for controlling the driver stage,
    a normal control loop electrically coupled to the external power source, the load, and the driver stage for receiving the input voltage and providing a first control command to the control stage,
    a backup control loop electrically coupled to the external power source, the load, and the driver stage for receiving the input voltage and providing a second control command to the control stage,
    a detection device configured to measure at least one electrical signal parameter of the driver stage and to determine an input voltage deviation from predefined supply conditions on the basis of the electrical signal parameter,
    wherein the control stage is configured to control the driver stage on the basis of the first control command, if the input voltage deviation is lower than the threshold level and on the basis of the second control command or both the first and the second control commands, if the input voltage deviation exceeds the threshold level, and
    wherein the driver stage is configured to control the input current according to predefined conditions if the input voltage deviation is lower than a threshold level and to allow a deviation of the input current from the predefined conditions if the input voltage deviation exceeds the threshold level.

2. Driver device as claimed in claim 1, wherein the control stage is configured to determine the first control command on the basis of the input voltage and the second control command on the basis of the electrical output power level.

3. Driver device as claimed in claim 1, wherein the control stage is configured to control the driver stage on the basis of the two control commands and on the basis of two weight factors determined according to the detected input voltage deviation from the predefined supply conditions.

4. Driver device as claimed in claim 1, wherein the control stage is designed to adapt the threshold level on the basis of measured ambient conditions, a power level, an age of the load and/or an age of the driver device.

5. Driver device as claimed in claim 1, wherein the control stage is designed to adapt the weight factors within a cycle period of the input voltage.

6. Driver device as claimed claim 1, wherein the detection device is connected to the input terminals for detecting the input voltage as the electrical parameter.

7. Driver device as claimed in claim 6, wherein the predefined supply conditions are a time dependent reference function for the input voltage.

8. Driver device as claimed in claim 6, wherein the detection device comprises a sampling device for sampling the input voltage.

9. Driver device as claimed in claim 8, wherein the detection device, comprises a reference generator for generating the reference function and for synchronizing the reference function to the input voltage.

10. Driver device as claimed in claim 1, wherein the detection device is connected to the output terminals for detecting an electrical output parameter of the driver stage as the electrical signal parameter.

11. Driver device as claimed in a claim 1, wherein the electrical signal parameter is determined on the basis of an internal control or sensing signal of the driver stage.

12. Driver device as claimed in claim 1, wherein the predefined conditions for the input current correspond to mains harmonic regulations.

13. A light apparatus comprising:
   a light assembly having one or more light units, in particular an LED unit comprising one or more LEDs, and
   a driver device for driving said light assembly as claimed in claim 1.

14. Driving method for driving a load comprising a light unit comprising one or more light emitters, the driving method comprising the steps of:
   receiving an input voltage from an external power supply at input terminals,
   controlling an input current drawn from the external power supply and providing electrical output power to output terminals having a predefined level for powering the load by means of a driver stage,
   measuring an electrical signal parameter of the driver stage,
   determining an input voltage deviation from predefined supply conditions on the basis of the electrical signal parameter,
   controlling the driver stage by a control stage, which receives a first control command generated from a normal control loop that receives the input voltage and a second control command generated from a backup control loop that receives the input voltage, wherein controlling the driver stage comprises controlling the driver stage on the basis of the first control command, if the input voltage deviation is lower than the threshold level and on the basis of the second control command or the first and the second control command, if the input voltage deviation exceeds the threshold level, and
   controlling the input current drawn from the external power supply according to predefined conditions if the input voltage deviation is lower than a threshold level and allowing a deviation of the input current from the predefined conditions if the input voltage deviation exceeds the threshold level.

* * * * *